(12) United States Patent
Mohrschladt et al.

(10) Patent No.: US 6,548,626 B1
(45) Date of Patent: Apr. 15, 2003

(54) METHOD FOR PREPARING POLYAMIDES FROM LACTAMS AND POLYAMIDE EXTRACTS

(75) Inventors: Ralf Mohrschladt, Schwetzingen (DE); Volker Hildebrandt, Mannheim (DE); Alfons Ludwig, Höxter (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/980,522

(22) PCT Filed: Mar. 5, 2000

(86) PCT No.: PCT/EP00/05121

§ 371 (c)(1),
(2), (4) Date: Dec. 3, 2001

(87) PCT Pub. No.: WO00/75216

PCT Pub. Date: Dec. 14, 2000

(30) Foreign Application Priority Data

Jun. 7, 1999 (DE) .......................... 199 25 906

(51) Int. Cl.$^7$ .................. C08G 69/02; C08G 69/14; C08G 69/16; C08G 69/48
(52) U.S. Cl. .................. 528/310; 528/312; 528/315; 528/323; 528/324; 528/480; 528/486; 528/492; 528/499; 526/67; 526/68; 526/70
(58) Field of Search .................. 528/310, 312, 528/323, 315, 486, 480, 499, 492; 526/67, 70, 68

(56) References Cited

U.S. PATENT DOCUMENTS

| | | | | |
|---|---|---|---|---|
| 6,359,020 B1 | * | 3/1902 | Mohrschladt | 528/310 |
| 4,049,638 A | | 9/1977 | Doerfer et al. | 528/323 |
| 5,077,381 A | | 12/1991 | Dellinger | 528/323 |
| 5,962,538 A | * | 10/1999 | Wiltzer et al. | 528/499 |
| 5,973,105 A | * | 10/1999 | Wiltzer et al. | 528/323 |

FOREIGN PATENT DOCUMENTS

WO 99/43735 9/1999

* cited by examiner

Primary Examiner—P. Hampton-Hightower
(74) Attorney, Agent, or Firm—Keil & Weinkauf

(57) ABSTRACT

A process for producing polyamides by reacting at least one lactam and optionally further polyamide-forming monomers with aqueous monomer and oligomer extracts obtained during the extraction with water of the polymer product obtained in the production of polyamides, the water content of the reaction mixture being in the range from 0.5 to 13% by weight comprises conducting the reaction in the presence of metal oxides, beta-zeolites, sheet-silicates or silica gels, which may be doped, as heterogeneous catalysts, the heterogeneous catalysts being used in the form which permits mechanical removal from the reaction mixture and are removed from the reaction mixture in the course of the polymerization or after it has ended.

8 Claims, No Drawings

METHOD FOR PREPARING POLYAMIDES FROM LACTAMS AND POLYAMIDE EXTRACTS

The present invention relates to a process for producing polyamides by reacting mixtures of at least one lactam and the extract obtained in the extraction of polyamides, under polyamide-forming conditions.

Polyamide which is mostly produced by polymerization of caprolactam has a caprolactam monomer and oligomer equilibrium content of from 8 to 15%, depending on the temperature. Caprolactam monomer and oligomer interfere with the further processing and are therefore usually removed by extraction with water, caprolactam-containing water or alcohol or by treatment with inert gases or by vacuum treatment after pelletization.

The extraction with water usually produces an extract water containing from about 2 to 15% by weight of caprolactam monomer and oligomer, and this extract water is recovered for economic and environmental protection reasons, the caprolactam monomer and oligomer being recycled back into the polymerization.

DE-A-43 21 683 and U.S. Pat. No. 4,049,638 describe processes for polycaprolactam production permitting the use of caprolactam having a water content of up to 15%.

EP-A-0 745 631 discloses the reuse of aqueous extract liquors through addition of small amounts of a di- or polycarboxylic acid, since the extract is otherwise slower to polymerize than caprolactam.

Since the extract also contains appreciable fractions of cyclic oligomers which remain unchanged during the polymerization, various processes have been proposed to crack these oligomers or convert them into linear oligomers. The oligomers are customarily cracked using phosphoric acid or high temperatures. For instance,: U.S. Pat. No. 5,077,381 describes a process for cracking the oligomers at from 220° C. to 290° C., preferably under elevated pressure.

Before recycling into the polymerization, the usually about 10% by weight extract liquor has to be first worked up, ie generally concentrated. The workup normally takes the form of the water being distilled off. DE-A-25 01 348 describes concentrating in the absence of atmospheric oxygen, the concentrating to more than 70% by weight being preceded by the addition of virgin caprolactam to the extract water. EP-A-0 123 881 discloses adding caprolactam to the extract liquor before the start of the concentrating to reduce oligomer separating out.

However, the use of the abovementioned processes for extract water recycling has revealed a serious disadvantage. The continuous recycling of the extract water is responsible for a substantial increase in the concentration of the oligomer and of the thermodynamically stable cyclic dimer not only in the reaction mixture but also in the polymer if, in the course of the continuous hydrolytic lactam polymerization, the cracking of the oligomers is not successful or the attainment of the chemical equilibria is too slow. In addition, the increase in the oligomer concentration is particularly high when the reaction mixture—to produce high molecular weight polyamides, for example—has a low water content.

It is an object of the present invention to provide a process for producing polyamide whereby the extract water from the extraction of polyamides may be further processed or recycled, the cracking of lactam dimers and higher oligomers and the attainment of the chemical equilibria during the melt polymerization is speeded up and polyamides having reduced total extractables and especially reduced dimer and oligomer content may be produced.

We have found that this object is achieved according to the invention by a process for producing polyamides by reacting at least one lactam and optionally further polyamide-forming monomers with aqueous monomer and oligomer extracts obtained during the extraction with water of the polymer product obtained in the production of polyamides, the water content of the reaction mixture being in the range from 0.5 to 13% by weight, which comprises conducting the reaction in the presence of metal oxides, beta-zeolites, sheet-silicates or silica gels, which may be doped, as heterogeneous catalysts, the heterogeneous catalysts being used in the form which permits mechanical removal from the reaction mixture and are removed from the reaction mixture in the course of the polymerization or after it has ended.

The polymerization is preferably carried out in at least 2 stages, the first stage being carried out under an elevated pressure at which the reaction mixture, with the exception of the heterogeneous catalyst, is present in the form of a single liquid phase and the second stage being carried out under a pressure in the range from 0.1 mbar to 1.5 bar for postcondensation, the heterogeneous catalyst being present in the first stage or both stages.

Preferably the reaction in the first stage is carried out at from 170° C. to 310° C. and from 5 to 40 bar. Preferably an adiabatic decompression is carried out in the second stage to discharge water and any lactam monomer or oligomer by flash evaporation.

The present invention accordingly provides a process for producing polyamides from at least one lactam, especially caprolactam, and optionally further monomers and optionally customary additive and filler substances which comprises reacting a reaction mixture comprising extract water from the extraction of polyamide and virgin lactam and having a water content of from 0.5 to 13% by weight in the presence of a heterogeneous metal oxide catalyst under polyamide-forming conditions. The process of the invention makes it possible to produce polyamides having a (compared with the prior art) distinctly reduced extractable content and especially reduced level of dimers and higher oligomers. The invention is advantageous in particular when the reaction mixture has a low water content, so that the (catalyst-free) oligomer cracking takes place particularly slowly.

The extract waters obtained in the polyamide extraction generally contain from 4 to 15% by weight of organics with or without inorganics. To be able to be recycled into the polymerization, these extract waters first have to be evaporated. This is effected in a conventional manner in a single- or multi-stage evaporation unit having a short residence time, for example in a Robert evaporator, a falling-film evaporator, a thin-film evaporator or a rotary evaporator. The evaporating is carried on to an extract content of not more than 85% by weight, since this concentration is still below that at which the dissolved constituents are observed to separate out. Preferably the evaporating is carried on to an extract content of 60 to 85% by weight, especially from 70 to 85% by weight. The evaporating temperatures are generally in the range from 103° C. to 115° C., preferably from 107° C. to 112° C. (at standard pressure). In general, the evaporating is carried out continuously.

Particularly preferably the extract water is admixed with virgin lactam even before the concentrating, especially when the extraction of the polyamide is not carried out with, caprolactam-containing water. This has the advantage that the extract concentrate is stabilized against oligomer separations even during the concentrating. The weight ratio of added caprolactam to extract content is set in the range from 0.1 to 1.5, preferably from 0.5 to 1.

The extract liquor concentrate from the concentrating generally has a temperature from 107° C. to 112° C. and is subsequently admixed with the lactam to be polymerized. Sufficient lactam is used for the resulting mixture to have a water content of from 0.5 to 13% by weight, preferably from 0.5 to 10% by weight, particularly preferably from 0.6 to 7% by weight, especially from 1 to 4% by weight, particularly preferably from 1.9 to 3.5% by weight. To set this water content, the concentrate is mixed with the lactam in a weight ratio which is generally in the range from 1:1 to 1:12, preferably from 1:1 to 1:10, especially from 1:1 to 1:8. The high lactam content (generally in the range from 79 to 95% by weight) improves the solubility of the oligomers present in the mixture, so that no separations are to be observed. The mixture is therefore stable and can be stored for at least several hours until further processing, without blockages being observedlin the equipment.

The mixture is then set to the polymerization which takes place in the presence of heterogeneous metal oxide catalysts. The polymerization is generally carried out continuously and essentially according to the processes described in DE-A-43 21 683 and DE-A-197 09 390, fixed beds of metal oxides being used in at least one of the reaction stages or zones. The catalyst or the mixture of various heterogeneous catalysts is preferably used in the reaction zones in which the reaction mixture is present as a single liquid phase.

Useful heterogeneous catalysts for the invention include known metal oxides such as zirconium oxide, aluminum oxide, magnesium oxide, cerium oxide, lanthanum oxide and preferably titanium dioxides as well as beta-zeolites and sheet-silicates.

Particular preference is given to titanium dioxide in the anatase form. The titanium dioxide is preferably not less than 70% by weight, particularly preferably not less than 90% by weight, especially wholly, in the anatase form. We have further found that silica gel, zeolites and doped metal oxides—useful dopants being ruthenium, copper or fluoride, for example—significantly improve the conversion of the reactants mentioned. Useful catalysts are particularly notable for their being slightly Brönsted acidic and having a large specific surface area. According to the invention, the heterogeneous catalyst has a macroscopic form which permits mechanical separation of the polymer melt from the catalyst, for example by means of sieves or filters. We propose that the catalyst be used in the form of extrudates, fixed beds, granules or catalyst-coated packings or materials.

The first reaction zone which, according to the invention, contains the catalyst(s) preferably polymerizes under such conditions that the mixture is present as a single liquid phase, ie at elevated temperature and elevated pressure. In general the polymerization is carried out at a temperature in the range from 170° C. to 310° C., preferably from 175° C. to 270° C., particularly preferably from 180° C. to 230° C., and at a pressure in the range from 5 to 40 bar, preferably from 12 to 20 bar.

However, to obtain high molecular weight polyamide the water content should be appreciably lowered. This is preferably accomplished through adiabatic expansion of the polymerization mixture, preferably at a pressure in the range from 0.1 mbar to 1.5 bar, especially from 1 mbar to 1.3 bar, particularly preferably atmospheric pressure. Owing to the adiabatic debinding or evaporation of the water, oligomers or additives cannot become deposited on the equipment. On the contrary, they remain dissolved or suspended in the polymer matrix, ensuring smooth progress of the polymerization.

A first preferred embodiment comprises bringing the mixture to be polymerized to a temperature in the range from 170° C. to 310° C. and a pressure in the range from 5 to 40 bar in the presence of heterogeneous catalysts in a first reaction zone, causing the polymerization to start. After the desired temperature and the desired pressure have been reached, at least one adiabatic expansion is carried out (as more particularly described hereinbelow). The product obtained after the expansion step is subjected to an atmospheric post-polymerization or optionally a postpolymerization under reduced pressure according to known processes in at least one reaction zone, which likewise contains heterogeneous catalysts if desired.

In another preferred embodiment, however, the product obtained after the expansion step is further polymerized in a first reaction zone at a temperature in the range from 170° C. to 310° C. and a pressure in the range from 5 to 40 bar, then subjected to a renewed adiabatic expansion and finally postpolymerized as described above in a second reaction zone. The further polymerization in the first reaction zone is generally carried out in a reaction vessel more particularly described hereinbelow.

In a further preferred embodiment, the mixture to be polymerized is brought to a further temperature of from 170° C. to 310° C. and a pressure of from 5 to 40 bar, for example by continuously sending the mixture through a heated heat exchanger within a few minutes. Subsequently the product is incipiently polymerized under the same pressure and temperature conditions in a first reaction zone which, according to the invention, contains the heterogeneous catalysts. The polymerization is generally carried out in a reaction vessel which, as well as the catalyst material, may also contain other internal figments, for example in a tubular reactor equipped with mixing elements. These can be ordered mixing elements (eg Sulzer packings) or orderless mixing elements such as dumped packing elements (eg Raschig rings, balls or Pall rings), and they may also be coated with metal oxide compounds, according to the invention. An exothermic polymerization of the reaction mixture takes place in this reaction zone, which for the aforementioned reasons is kept at appropriate pressure and temperature conditions to ensure that the reaction system forms a single phase. The residence time is generally in the range from 0.5 to 3 hours, preferably in the range from 1 to 2 hours.

The pressurized reaction mixture is subsequently expanded adiabatically into a separation zone. The pressure in this separation zone is generally in the range from 0.1 mbar to 1.5 bar, preferably in the range from 10 to 1300 mbar. The process of expansion is accompanied by a flash evaporation (utilizing the heat stored in the polymer melt) of the water still present in the polymer. Unlike with the conventional vaporization of water at a heat exchanger surface, a flash evaporation, as mentioned, is a process without separations taking place onto heat exchanger surfaces and other apparatus surfaces from the polymer matrix. Failing due to organic or inorganic deposits is avoided. In addition, the heat released in the process is directly utilized for water vaporization, representing a further energy and cost saving. What is more, cooling of the reaction mixture is desired, since the polycondensation equilibrium is shifted by decreasing temperature to the side of the higher molecular weight product. The water vapor released in the course of the expansion step contains volatile constituents such as caprolactam monomer and oligomer. Rectification through a column can be used to remove the water vapor from the system and to recycle the organics back into the process.

The polycaprolactam obtained downstream of the separation zone from the use of caprolactam generally has a molecular weight in the range from 3000 to 18000 g/mol, preferably from 6000 to 12000 g/mol. The melt viscosity is in the range from 1 to 200 Pas at 270° C. The polymer melt is either, immediately following the separation zone, transferred into a postreaction zone, where further molecular weight buildup takes place, or directly converted into piece form according to customary processes. The postreaction zone according to the invention may likewise be equipped with the aforementioned heterogeneous catalysts whereby not only the oligomer content is further reduced, but also the condensation rate is increased.

When the water concentration in the concentrated, lactam-admixed extraction solution is high and a low temperature is chosen in the hydraulically operated first reaction zone, it is advisable to employ a flash evaporation involving two or more stages. This stops the temperature of the reaction mixture dropping to below the polymer melt temperature in the course of the adiabatic vaporization. To this end the mixture of concentrate and lactam is heated up as described above and passed into the first reaction zone, which contains the catalyst granules and where the mixture heats up further as a result of the reaction. The pressure is preferably again chosen so that the reaction mixture is present as a single liquid phase.

The pressurized reaction mixture is subsequently expanded adiabatically into a first separation zone, the pressure in this separation zone being in the range from 1 to 20 bar, preferably from 6 to 15 bar, particularly preferably from 8 to 12 bar. The process of expansion is accompanied by a flash evaporation whereby some of the water in the polymer is liberated utilizing the previously stored heat of reaction and enthalpy. The residence time in the first evaporation zone is generally chosen in the range from 5 to 60 minutes, preferably from 20 to 30 minutes. The pressurized mixture is subsequently passed through a further heat exchanger into a further reactor and heated to temperatures in the range from 220 to 310° C., preferably from 230 to 290° C., particularly preferably from 235 to 260° C., in the course of a few minutes. The pressure in this reactor, which according to the invention may likewise contain heterogeneous catalysts, is preferably again set so that the reaction mixture forms a single liquid phase, the pressure generally being in the range from 1 to 20 bar, preferably from 6 to 20 bar, preferably from 12 to 18 bar. The reaction mixture is then again adiabatically expanded into a second separation zone. The pressure in the second separation zone is chosen in the range from 10 to 1300 mbar. This process of reheating the reaction mixture followed by a flash evaporation can be repeated, if necessary. The amount of water evaporated in the various separation zones and the associated lowering in the temperature can be specifically controlled through the particular pressure established.

Useful lactams include for example caprolactam, enantholactam, capryllactam and lauryllactam and also mixtures thereof, preferably caprolactam.

Useful further monomer units include for example dicarboxylic acids, such as alkanedicarboxylic acids of from 6 to 12 carbon atoms, especially of from 6 to 10 carbon atoms, such as adipic acid, pimelic acid, suberic acid, azelaic acid or sebacic acid and also terephthalic acid and isophthalic acid, diamines, such as $C_4$-$C_{12}$-alkylenediamines, especially of from 4 to 8 carbon atoms, such as hexamethylenediamine, tetramethylenediamine or octamethylenediamine, also m-xylylenediamine, bis(4-aminophenyl)methane, bis(aminophenyl)-2,2-propane or bis((4-aminocyclohexyl) methane and also mixtures of dicarboxylic acids and diamines, advantageously in an equivalent ratio, such as hexamethylenediammonium adipate, hexamethylenediammonium terephthalate, in amounts ranging from 0 to 60, preferably from 10 to 50, % by weight, based on the total amount of monomers. Special industrial significance has been attained by polycaprolactam and polyamides polymerized from caprolactam, hexamethylenediamine and also adipic acid, isophthalic acid and/or terephthalic acid.

A preferred embodiment utilizes caprolactam and hexamethylenediammonium adipate ("66 salt"), the 66 salt being used in the form of an aqueous solution. The molar ratio of caprolactam to 66 salt is customarily in the range from 99.95:0.05 to 80:20, preferably from 95:5 to 85:15.

As customary additives and fillers there may be used pigments, such as titanium dioxide, silicon dioxide or talc, chain regulators, such as aliphatic and aromatic carboxylic and dicarboxylic acids, such as propionic acid or terephthalic acid, stabilizers, such as copper(I) halides and alkali metal halides, nucleating agents, such as magnesium silicate or boron nitride, homogeneous catalysts, such as phosphorous acid, and also antioxidants in amounts ranging from 0 to 5% by weight, preferably from 0.05 to 1% by weight, based on the total amount of monomers. The additives are generally added prior to the pelletizing and before, during or after, preferably after, the polymerization. It is particularly preferable to add the additives to the reaction mixture only after it has passed through the reaction Zones which contain the heterogeneous catalysts.

The polymer obtained according to the invention can then be further processed according to customary processes, for example converted into piece form in a conventional manner by melt-extruding it in the form of melt profiles, which are quenched in a waterbath and then pelletized. The pellets can then be conventionally extracted and subsequently or simultaneously converted into high molecular weight polylactam. The extraction can be effected for example with water or aqueous caprolactam solution. Another possibility is gas phase extraction as described for example in EP-A-0 284 968. The desired viscosity number for the end product is generally in the range from 120 to 350 ml/g. It can be set in a conventional manner.

The examples hereinbelow illustrate the process of the invention. Unless otherwise stated, all quantities and percentages herein are by weight.

EXAMPLE

Unextracted nylon-6 pellet is countercurrently extracted with hot water. The resulting 10% extract liquor is concentrated to an organics and inorganics content of 80% at, 108° C. in a single-stage evaporator. The water-free extract fraction of the liquor contains 79.1% of caprolactam monomer, 5.7% of caprolactam dimer and 3.8% of caprolactam trimer.

The hot concentrated 80% extract water concentrate liquor is then pumped into a heated mixing vessel and mixed therein with virgin lactam. The reactant mixture obtained contains 2.0% of water and is continuously polymerized in the Miniplant apparatus described hereinbelow.

The caprolactam/extract water concentrate mixture is pumped at a rate of 0.5 kg/h to a heated heat exchanger and heated therein to the desired temperature within about 10 minutes. The pressure side of the feed pump is set to about 10 bar to ensure that the reaction system forms a single phase. The heated reaction mixture is subsequently pumped through a heated cylindrical tube, the prereactor, having an internal diameter of 12 mm and a length of 1000 mm. The tube is packed with catalyst pellets prepared from titanium dioxide from Finnti, type S150, and having a diameter of 4 mm and a length in the range from 5 to 20 mm. The titanium dioxide is present in the anatase form and is held by sieves in the reaction tube and separated from the exiting product stream. The residence time in the tube is 1.2 hours. The reaction mixture, which is under a pressure of about 10 bar, is continuously expanded at the end of the tube by a control valve into a heated cylindrical separation vessel and to an absolute pressure of 2.5 bar. The reaction mixture forms two phases in the process, so that the water it contains is able to evaporate. The temperature of the polymer melt decreases to 245° C. After a 3 h residence in the separation vessel, which also serves as postreaction zone, the polymer is continuously pumped, by a melt pump, from the base region of the postreactor via a die into a waterbath in the form of melt profiles which are solidified in the waterbath, pelletized and extracted with hot water.

For extraction, 100 parts by weight of nylon-6 are stirred with 400 parts by weight of completely iron-free water at 100° C. for 32 hours under reflux and, after the water has been removed, dried under mild conditions, ie without risk of postcondensation, at 100° C. under reduced pressure for 20 hours. The relative viscosity (RV) of the extracted polyamide is determined in 1.0% by weight solution in 96% by weight sulfuric acid at 25° C. by means of an Ubbelohde viscometer.

The dimer content of the polymer is determined by HPLC analysis of the extract.

Comparative Examples

In the comparative examples, the titanium dioxide pellet in the cylindrical reactor is replaced with Raschig rings 6 mm in diameter and the reaction mixture is polymerized similarly to the above description.

The extractables and dimer contents of the products obtained in the inventive and comparative examples and the relative viscosities of the extracted samples are reported in Tables 1, 2 and 3 together with the corresponding prereactor temperatures.

The results in Table 1 show that the products obtained according to the invention in the presence of the catalyst have distinctly higher viscosities than the comparative example polymers at all prereactor temperatures and especially at temperatures of less than 230° C.

As the results in Table 2 show, the extractables content of polymers not obtained catalytically increases very sharply below a prereactor temperature of 230° C. and is distinctly above the extractables contents of the polyamides produced according to the invention. High extractables values mean that the monomer conversion is inadequate, that the extraction expense increases and that the production of the polyamide is comparatively uneconomical.

Polyamide production which is inexpensive compared with the prior art is thus possible at low temperatures only if caprolactam is reacted in the presence of the catalyst according to the invention. As the results in Table 3 show, at low reaction temperatures in the prereactor below 230° C. the dimer content is distinctly lower than at temperatures equal to or greater than 240° C.

TABLE 1

Viscosities of polyamides produced in the presence of the titanium dioxide catalyst according to the invention.

| | Relative viscosity | |
| --- | --- | --- |
| Prereactor temp.[° C.] | Inventive examples | Comparative examples |
| 190 | 1.97 | 1.71 |
| 200 | 1.97 | 1.78 |
| 210 | 2.01 | 1.84 |
| 220 | 2.02 | 1.91 |
| 230 | 2.00 | 1.99 |
| 240 | 2.06 | 2.03 |

TABLE 2

Extractable contents of the polyamides produced in the presence of the titanium dioxide catalyst according to the invention

| | Extractables content [%] | |
| --- | --- | --- |
| Prereactor temp.[° C.] | Inventive examples | Comparative examples |
| 190 | 11.83 | 29.33 |
| 200 | 11.47 | 23.63 |
| 210 | 11.37 | 19.83 |
| 220 | 10.83 | 14.03 |
| 230 | 10.77 | 11.20 |
| 240 | 10.40 | 10.60 |

TABLE 3

Dimer contents of polyamides produced in the presence of the titanium dioxide catalyst according to the invention

| Prereactor temp.[° C.] | Dimer content [%] Examples |
| --- | --- |
| 190 | 0.60 |
| 200 | 0.64 |
| 210 | 0.74 |
| 220 | 0.77 |
| 230 | 0.85 |
| 240 | 0.86 |

We claim:

1. A process for producing polyamides by reacting at least one lactam and optionally further polyamide-forming monomers with aqueous monomer and oligomer extracts obtained during the extraction with water of the polymer product obtained in the production of polyamides, the water content of the reaction mixture being in the range from 0.5 to 13% by weight, which comprises conducting the reaction in the presence of metal oxides, beta-zeolites, sheet-silicates or silica gels, optionally doped, as heterogeneous catalysts, the heterogeneous catalysts being used in the form which permits mechanical removal from the reaction mixture and are removed from the reaction mixture in the course of the polymerization or after it has ended.

2. A process as claimed in claim 1, wherein the heterogeneous catalysts are used in the form of granules, extrudates, fixed beds or catalyst-coated packings or internals.

3. A process as claimed in claim 1, wherein the metal oxide catalysts are selected from the group consisting of zirconium oxide, aluminum oxide, magnesium oxide, cerium oxide, lanthanum oxide, titanium oxide, beta-zeolites and sheet-silicates.

4. A process as claimed in claim 3, wherein the metal oxide catalyst used is titanium oxide not less than 70% by weight in the anatase form.

5. A process as claimed in claim 1, wherein the polymerization is effected in at least 2 stages, the first stage being carried out under an elevated pressure at which the reaction mixture, with the exception of the heterogeneous catalyst, is present in the form of a single liquid phase and the second stage being carried under a pressure in the range from 0.1 mbar to 1.5 bar for postcondensation, the heterogeneous catalyst being present in the first stage or both stages.

6. A process as claimed in claim 5, wherein the reaction in the first stage is carried out at from 170° C. to 310° C. and from 5 to 40 bar.

7. A process as claimed in claim 5, wherein an adiabatic decompression is carried out in the second stage to discharge water and any lactam monomer or oligomer in the reaction mixture by flash evaporation.

8. A process as claimed in claim 1 wherein the lactam used is caprolactam.

* * * * *

UNITED STATES PATENT AND TRADEMARK OFFICE
CERTIFICATE OF CORRECTION

PATENT NO. : 6,548,626 B1
DATED : April 15, 2003
INVENTOR(S) : Ralf Mohrschladt et al.

It is certified that error appears in the above-identified patent and that said Letters Patent is hereby corrected as shown below:

<u>Title page</u>,
Item [22], "Mar. 5, 2000" should be -- June 5, 2000 --.

Signed and Sealed this

Ninth Day of September, 2003

JAMES E. ROGAN
*Director of the United States Patent and Trademark Office*